(12) United States Patent
Burbridge et al.

(10) Patent No.: US 12,372,199 B2
(45) Date of Patent: Jul. 29, 2025

(54) ACTUATOR ASSEMBLIES AND METHODS OF CONTROLLING THE SAME

(71) Applicant: CAMBRIDGE MECHATRONICS LIMITED, Cambridge (GB)

(72) Inventors: Daniel John Burbridge, Cambridge (GB); Stephen Matthew Bunting, Cambridge (GB); Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 991 days.

(21) Appl. No.: 17/283,443

(22) PCT Filed: Oct. 10, 2019

(86) PCT No.: PCT/GB2019/052875
§ 371 (c)(1),
(2) Date: Apr. 7, 2021

(87) PCT Pub. No.: WO2020/074900
PCT Pub. Date: Apr. 16, 2020

(65) Prior Publication Data
US 2021/0348714 A1    Nov. 11, 2021

(30) Foreign Application Priority Data
Oct. 10, 2018  (GB) .................................... 1816544
Dec. 24, 2018  (GB) .................................... 1821187

(51) Int. Cl.
*H04N 13/221*  (2018.01)
*F03G 7/06*    (2006.01)
(Continued)

(52) U.S. Cl.
CPC ............. *F16M 13/022* (2013.01); *F03G 7/06* (2013.01); *F03G 7/06143* (2021.08);
(Continued)

(58) Field of Classification Search
CPC ...... H04N 13/221; H04N 23/50; H04N 23/55; H04N 23/687; G03B 13/34; G03B 15/02;
(Continued)

(56) References Cited

U.S. PATENT DOCUMENTS 4,829,767 A    5/1989  Mecca
5,531,664 A *  7/1996  Adachi ................ A61B 1/0052
                                                      600/152
(Continued)

FOREIGN PATENT DOCUMENTS

CN         1763622 B      5/2010
CN       105 099 119      6/2018
(Continued)

OTHER PUBLICATIONS

GB Search Report dated May 2, 2019 of GB Application 1816544.9.
(Continued)

*Primary Examiner* — Twyler L Haskins
*Assistant Examiner* — John H Morehead, III
(74) *Attorney, Agent, or Firm* — Van Hoven PC; Stefan D. Osterbur; Joshua Van Hoven

(57) ABSTRACT

An actuation assembly comprising: a support structure; a movable element movable relative to the support structure, the movable element having a principal axis; and an actuator arrangement for driving movement of the movable element with respect to the support structure, wherein said movement includes rotational movement of the movable element about an axis which is perpendicular to said principal axis and does not pass through the centre of the movable element, and wherein said movement also includes translational movement of the movable element in a direction perpendicular to the principal axis. The actuation assembly may be used to perform optical image stabilisation or to improve the performance of a 3D sensing system.

17 Claims, 10 Drawing Sheets

(51) Int. Cl.
*F16M 13/02* (2006.01)
*G02B 7/04* (2021.01)
*G02B 7/08* (2021.01)
*G02B 27/64* (2006.01)
*G03B 13/34* (2021.01)
*G03B 15/02* (2021.01)
*H04N 23/50* (2023.01)
*H04N 23/55* (2023.01)
*H04N 23/68* (2023.01)

(52) U.S. Cl.
CPC .............. *F03G 7/066* (2021.08); *G02B 7/04* (2013.01); *G02B 7/08* (2013.01); *G02B 27/646* (2013.01); *G03B 13/34* (2013.01); *H04N 13/221* (2018.05); *H04N 23/50* (2023.01); *H04N 23/55* (2023.01); *H04N 23/68* (2023.01); *G03B 15/02* (2013.01); *G03B 2205/00* (2013.01); *G03B 2205/0076* (2013.01); *G03B 2205/0084* (2013.01); *H04N 23/687* (2023.01)

(58) Field of Classification Search
CPC .... G03B 2205/0076; G03B 2205/0084; G02B 7/04; F16M 13/022; F03G 7/06143
See application file for complete search history.

(56) References Cited

U.S. PATENT DOCUMENTS

| | | | |
|---|---|---|---|
| 2006/0082674 A1 | 4/2006 | Noji | |
| 2006/0272328 A1* | 12/2006 | Hara | H04N 23/54 60/527 |
| 2009/0295986 A1* | 12/2009 | Topliss | G02B 7/026 396/73 |
| 2011/0141294 A1 | 6/2011 | Lam et al. | |
| 2011/0179786 A1* | 7/2011 | Topliss | G03B 3/10 60/527 |
| 2012/0019675 A1 | 1/2012 | Brown | |
| 2013/0002933 A1* | 1/2013 | Topliss | H04N 23/60 310/306 |
| 2013/0208369 A1 | 8/2013 | Lam | |
| 2013/0222685 A1* | 8/2013 | Topliss | G02B 27/646 348/373 |
| 2014/0055630 A1* | 2/2014 | Gregory | H04N 23/6812 348/208.2 |
| 2015/0009345 A1 | 1/2015 | Tsubaki | |
| 2016/0209670 A1* | 7/2016 | Brown | F03G 7/065 |
| 2017/0106998 A1 | 4/2017 | Zhou et al. | |
| 2017/0336646 A1* | 11/2017 | Miller | H04N 23/67 |
| 2018/0149142 A1* | 5/2018 | Bunting | F03G 7/0616 |
| 2018/0284475 A1* | 10/2018 | Howarth | F03G 7/065 |

FOREIGN PATENT DOCUMENTS

| | | | | |
|---|---|---|---|---|
| GB | 2425907 | 11/2006 | | |
| JP | S6119981 | 1/1986 | | |
| JP | H11 345378 | 12/1999 | | |
| JP | 2013-125080 | 6/2013 | | |
| JP | 2014-059501 | 4/2014 | | |
| WO | WO-2012038703 A2 * | 3/2012 | ............... | F03G 7/06 |
| WO | WO-2013121225 A1 * | 8/2013 | ............... | F03G 7/06 |
| WO | WO-2017134456 A1 * | 8/2017 | ............. | F03G 7/065 |
| WO | WO 2017212262 | 12/2017 | | |
| WO | WO 2018135732 | 7/2018 | | |

OTHER PUBLICATIONS

GB Search Report dated Jun. 20, 2019 of GB Application 1821187. 0.
International Search Report and Written Opinion of PCT/GB2019/052875 dated Mar. 17, 2020.

* cited by examiner

ACTUATOR ASSEMBLIES AND METHODS OF CONTROLLING THE SAME

CROSS-REFERENCE TO RELATED APPLICATIONS

This application is a national stage application under 35 U.S.C. § 371 of International Application PCT/GB2019/052875, filed Oct. 10, 2019, which claims priority of GB Patent Applications 1816544.9, filed Oct. 10, 2018, and 1821187.0, filed Dec. 24, 2018. The disclosure of which are hereby incorporated by reference herein in their entireties.

The present techniques generally relate to the control of an actuation assembly and in particular, but not exclusively, are concerned with control of an optical element for the purpose of optical image stabilisation or for generating a three-dimensional (3D) representation of a scene (also known as 3D sensing).

Optical systems which stabilise an image formed on an image sensor are known. For example, in cameras, particularly miniature cameras, actuators are used to drive movement of a camera lens element along the optical axis of the lens, or to provide optical image stabilisation (OIS) in a camera by driving tilting of a camera unit including a lens element and an image sensor. WO 2011/104518 discloses examples of such OIS systems in miniature cameras.

Typically, OIS in miniature cameras is performed by moving a lens element laterally relative to an image sensor to compensate for the movement of the image due to shake (translational or orientational) applied to the camera. FIG. 4 shows a schematic cross sectional view of a typical camera apparatus incorporating such OIS. As shown, translational movement of the lens element 10 in a plane perpendicular to the optical axis (parallel to the plane of the image sensor 20) is used to compensate for shake.

In such arrangements, the maximum amplitude of the shake that can be compensated for and so removed from the image through OIS is dependent on the maximum distance that the lens element can be translated by the actuator(s). This, in turn, is dependent on the dimensions of the actuators which, for miniaturization reasons, are generally small.

An object of the present techniques is to provide new actuator assemblies and methods of controlling actuator assemblies. A further object of the present techniques is to improve the amount of shake that can be compensated for through OIS. A further object of the present techniques is to improve the performance or resolution of a 3D sensing system.

Approaches of the present techniques aim to provide an actuator assembly and methods of controlling actuator assemblies which satisfies one or more of the above objects.

At their broadest, approaches of the present techniques provide actuator assemblies and methods of controlling actuator assemblies in which a movable element is rotated about an axis perpendicular to the principal axis of the movable element but not passing through the centre of the movable element.

A first approach of the present techniques provides an actuation assembly comprising: a support structure; a movable element movable relative to the support structure, the movable element having a principal axis; and an actuator arrangement for driving movement of the movable element with respect to the support structure, wherein said movement includes rotational movement of the movable element about an axis which is perpendicular to said principal axis and does not pass through the centre of the movable element, and wherein said movement also includes translational movement of the movable element in a direction perpendicular to the principal axis. The actuation assembly may be used to perform optical image stabilisation or to generate a 3D representation of a scene.

A related approach of the present techniques provides an actuation assembly comprising: a support structure; a movable element, the movable element being supported on the support structure so as to be movable relative to the support structure, and the movable element having a principal axis; a vibration sensor arranged to sense vibration of the actuation assembly and generate output signals representative of said movement; an actuator arrangement arranged to drive movement of the movable element with respect to the support structure; and a control circuit arranged to control the actuator arrangement to drive movement of the movable element relative to the support structure in response to the output signals from the vibration sensor, wherein said movement includes rotational movement of the movable element about an axis which is perpendicular to said principal axis and does not pass through the centre of the movable element, and wherein said movement also includes translational movement of the movable element in a direction perpendicular to the principal axis.

By controlling the movement of the movable element such that it rotates in this manner, the amount of vibration that can be mitigated by the actuation assembly may be increased and/or the performance/resolution of a 3D sensing system may be increased.

The actuation assembly may further comprise a suspension system supporting the movable element on the support structure, wherein the suspension system is arranged to guide rotational movement of the movable element about an axis which is perpendicular to said principal axis and does not pass through the effective centre of the movable element.

A related approach of the present techniques provides an actuation assembly comprising: a support structure; a movable element, the movable element having a principal axis; and a suspension system supporting the movable element on the support structure so as to be movable relative to the support structure, the suspension system being arranged to guide rotational movement of the movable element about an axis which is perpendicular to said principal axis and does not pass through the centre of the movable element.

As a result of the suspension system guiding the movable element to rotate in this manner, the amount of vibration that can be mitigated by the actuation assembly, for example in order to stabilise an image, may be increased and/or the options for the movement of the movable element in order to stabilise the assembly may be increased.

The actuation assembly may further include an actuator arrangement arranged to drive movement of the movable element with respect to the support structure, wherein the actuator arrangement is arranged to drive translational movement of the movable element in at least one direction perpendicular to the principal axis and the suspension system at least partially converts said translational movement into said rotational movement.

The following optional and preferred features can be used in combination with either of the above approaches and are combinable in any combination of some, all or none of the respective features.

The movable element may be a lens element. The lens element, or the lenses within the lens element, may have a diameter of at most 20 mm, preferably at most 15 mm, preferably at most 10 mm.

The actuation assembly may comprise a sensor attached to or formed on the support structure. The movable element may be arranged to focus electromagnetic radiation on the sensor. In such examples the principal axis may be an optical axis of the movable element. The actuator arrangement may drive movement of the movable element in order to focus the electromagnetic radiation on the image sensor. The sensor may be any suitable receiver/detector/sensor. For example, the sensor may be any one of: a light sensor, an image sensor, a photodetector, a complementary metal-oxide-semiconductor (CMOS) image sensor, an active pixel sensor, a charge-coupled device (CCD), a time-of-flight sensor. The movable element may be an optical element. The optical element may be any one of: a lens, a lens stack, a diffractive optical element, a filter, a prism, a mirror, a reflective optical element, a polarising optical element, a dielectric mirror, a metallic mirror, a beam splitter, a grid, a patterned plate, a grating, and a diffraction grating.

The actuation assembly may be used to control a camera assembly that may form part of an electronic device such as a smartphone, tablet computer or the like in which miniaturisation of the camera assembly is desirable.

Alternatively, the actuation assembly described herein may be used in devices/systems suitable for image capture, 3D sensing, depth mapping, aerial surveying, terrestrial surveying, surveying in or from space, hydrographic surveying, underwater surveying, LIDAR, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

In embodiments, the actuation assembly may comprise a light source arranged to emit illumination onto a scene, wherein the actuator arrangement drives movement of the illumination across at least part of the scene. This may enable a 3D representation of a scene to be generated. Techniques for performing 3D sensing are described in International Patent Publication No. WO2018/096347, and United Kingdom Patent Application Nos. GB1805558.2, GB1808804.7 and GB1812818.1. The movable element may be any one of: a lens, a prism, and a mirror; and the actuator arrangement may be arranged to drive movement of the illumination by moving the movable element.

In alternative embodiments, the movable element may itself be a light source arranged to emit illumination onto a scene, wherein the actuator arrangement drives movement of the movable element to move the illumination across at least part of the scene. The movable element may be a source of electromagnetic radiation (e.g. a laser) or a dot projector (which may emit uniform or non-uniform illumination).

In either case, the illumination may be uniform or non-uniform.

Thus, the movable element may be any optical element, such as, but not limited to: a lens, a lens stack, a diffractive optical element, a filter, a prism, a mirror, a reflective optical element, a polarising optical element, a dielectric mirror, a metallic mirror, a beam splitter, a grid, a patterned plate, a grating, and a diffraction grating. In embodiments, the movable element may be a dot projector or a light source (which may emit uniform or non-uniform illumination).

The driven or guided movement of the movable element may also include translational movement of the movable element in a direction perpendicular to the principal axis.

When both translation movement and off-centre rotation are possible, a range of possibilities exist for stabilisation, e.g. of an image. These possibilities can be used concurrently to complement each other, as successive alternatives to each other, or in any other combination.

The actuation assembly may comprise a control circuit for controlling the actuator arrangement to drive movement of the movable element relative to the support structure.

The control circuit may be arranged to: translate the movable element in a direction perpendicular to the principal axis; and rotate the movable element about the axis perpendicular to the principal axis that does not pass through the centre of the movable element. Thus, the movable element may be translated as far as possible (where the motion of the movable element may be restricted by physical end-stops), before rotating the movable element. Optionally, the control circuit is arranged to rotate the movable element after the translation.

In arrangements having a suspension system, the suspension system may be directly responsible for causing the desired rotational movement. An appropriate design of the suspension system may thus simplify the control needed to accomplish the desired stabilisation.

A wide range of possibilities exist for the design of such a suspension system. For example, the suspension system may include a spring plate positioned between the support structure and the movable element, wherein the shape of the spring plate guides said rotational movement when the movable element is translated in a direction perpendicular to said optical axis. In other arrangements the suspension system may include a bearing surface or pin flexures whose shape and/or configuration is such as to guide said rotational movement when the movable element is translated in a direction perpendicular to said optical axis.

The spring plate may take a number of forms. For example, the spring plate may be curved.

In some examples the spring plate may be in the form of a partial sphere whose axis of rotational symmetry is the principal axis, or whose centre lies on an axis perpendicular to the plane of an image sensor (if present).

In other examples, the spring plate may be in the form of a cone whose axis of rotational symmetry is perpendicular to the plane of the image sensor.

In both of the above configurations, any translational movement in a direction perpendicular to the optical axis will directly cause rotational movement, with the extent of the rotational movement being determined by the shape of the spring plate.

It will be appreciated that different shapes of spring plate may be used which achieve this effect without being strictly defined as a partial sphere or a cone and such shapes would also achieve the effects of the present techniques and are therefore included within the scope of these techniques. For example, the spring plate may have a generally conical configuration, but with a rounded-nose.

When geometric terms such as "planar", "sphere" and "cone" are used herein, they are to be understood as including variations of such shapes which, whilst not necessarily meeting the strict geometric requirements of the indicated shape, nevertheless achieve the same practical effects.

Alternatively, the spring plate may have a stepped arrangement. For example, the spring plate may have a planar central region arranged perpendicular to the plane of the image sensor and an outer region which is angled relative to the central region, such that translational movement of the movable element across the central region does not cause the lens element to rotate and translational movement of the movable element across the outer region causes the lens element to rotate. This stepped arrangement will result in a configuration in which movement up to a certain point from the starting position takes place only in a translational sense and without rotation, whilst movement after a certain distance from the starting position results in rotation.

It will be appreciated that the spring plate may combine the curved and stepped arrangements such that, for example, the spring plate has the stepped configuration, but the angled outer region is curved. Alternatively, the central region of the spring plate may be curved with a particular degree of curvature, whilst the outer region has a different (greater or lesser) degree of curvature.

In certain examples the suspension system may include a plurality of beams each having an extent along the optical axis and from which the movable element is suspended, the beams each having a first end which is connected to the movable element and a second end which is connected to the support structure, wherein the distance between the first ends of any pair of said beams is different from the distance between the second ends of said pair of pillars.

In this configuration, a trapezium arrangement is formed (the pillars form the sloping sides of the trapezium when the arrangement is viewed perpendicular to the optical axis, with the top and base of the trapezium being formed by (imaginary) lines joining the first ends and the second ends respectively). The trapezium arrangement results in translational movement of the movable element perpendicular to the optical axis being converted into rotational movement of the movable element about an axis perpendicular to the optical axis, but not passing through the centre of the movable element.

In other examples, the suspension system may include a plurality of flexures each having an extent along the optical axis, and the actuation assembly may further comprise at least one fixed obstruction element, the obstruction element or elements being arranged to engage with said flexures so as to cause bending of at least one of said flexures when the movable element is moved more than a predetermined distance in a direction perpendicular to the principal axis of the movable element, and thus guide rotation of the movable element about an axis perpendicular to the optical axis. In this configuration, the lens element may be permitted to move solely translationally up to the predetermined distance perpendicular to the optical axis. When the movable element reaches the predetermined distance, at least one of the flexures may engage with at least one of the obstruction elements and bend, thus causing the desired rotation.

In certain arrangements, the actuator arrangement may be arranged to drive translational movement of the movable element in at least one direction perpendicular to the principal axis, the suspension system at least partially converting said translational movement into said rotational movement. This means that an actuator arrangement which is, in itself, only capable of driving translational movement of the movable element can be used to drive rotational movement as well, with the relationship between the translational and rotational movement being defined by the suspension system. That can mean that a simpler and/or cheaper actuator arrangement may be used, whilst still obtaining the benefits of the rotational movement of the movable element.

The relationship between the translational movement in the first direction and the rotational movement may be fixed and may be stored, for example, in a memory device, so that the complete effect of a particular translational movement on the movement of the movable element can be known and can be predicted in advance.

In certain arrangements, the actuator arrangement can drive translational movement of the movable element in at least one of three mutually orthogonal directions and can drive rotational movement of the movable element about at least one of three mutually orthogonal axes. For example, the movable element may translate in one direction/along one axis, and may rotate about an orthogonal direction/axis. The translation and rotation may occur relative to the same axis (e.g. x axis) or relative to different axes (e.g. rotation about the x axis and translation along the y axis). In other arrangements, the actuator arrangement can drive translational movement of the movable element in a plurality of orthogonal directions and can drive rotational movement of the movable element about a plurality of mutually orthogonal axes.

In such arrangements the actuator arrangement is able to drive the movement of the movable element with a large number of degrees of freedom. In order to achieve the desired image stabilisation, the control circuit and/or the suspension system are arranged to cause the desired range and type of movement.

The actuator arrangement may include a plurality of SMA actuator wires. These SMA actuator wires may also form part of the suspension system.

A second approach of the present techniques provides a method of controlling an actuation assembly, the actuation assembly comprising a support structure, and a movable element, the movable element being supported on the support structure so as to be movable relative to the support structure and having a principal axis, wherein the method comprises: moving the movable element relative to the support structure by rotating the movable element about an axis which is perpendicular to the principal axis and does not pass through the centre of the movable element; and translating the movable element in a direction perpendicular to the principal axis.

A related approach of the present techniques provides a method of controlling an actuation assembly, the assembly comprising a support structure, and a movable element, the movable element being supported on the support structure so as to be movable relative to the support structure and having a principal axis, wherein the method includes the steps of: sensing vibration of the actuation assembly; and moving the movable element relative to the support structure in response to the sensed vibration in order to stabilise the actuation assembly, wherein the step of moving includes rotational movement of the movable element about an axis which is perpendicular to the principal axis and does not pass through the centre of the movable element; and translating the movable element in a direction perpendicular to the principal axis.

By rotating the movable element in this manner, the amount of vibration that can be mitigated by the actuation assembly, for example in order to stabilise an image on an image sensor fixed to the support structure, may be increased and/or the options for the movement of the movable element in order to stabilise the image may be increased.

In certain examples, the movable element may be a lens element having at least one lens arranged to focus an image on an image sensor on the support structure and the method may control the movement of the lens element in order to stabilise the image sensed by the image sensor.

The camera assembly may further comprise a suspension system supporting the movable element on the support structure and arranged to guide said rotational movement, and the step of moving may include driving the movable element in a first direction perpendicular to said optical axis, the suspension system at least partially converting movement in said first direction into said rotational movement.

With such a suspension system, the method may be used with a simpler arrangement of actuators to drive the movement of the movable element, as the rotational movement results from the arrangement of the suspension system. The relationship between the translational movement in the first direction and the rotational movement may be fixed and may be stored, for example, in a memory device, so that the complete effect of a particular translational movement on the movement of the movable element is known.

Generally speaking, using a tilt/rotation to stabilise the image may result in blur at the edges of the image sensed by the image sensor. Therefore, in embodiments, the step of moving the movable element may comprise: first translating the movable element in a direction perpendicular to the principal axis; and then rotating, following the translating, the movable element about the axis perpendicular to the principal axis that does not pass through the centre of the movable element. In embodiments, the movable element may be translated as far as possible (where the motion of the movable element may be restricted by physical end-stops), before rotating the movable element.

The camera assembly may further comprise an actuator arrangement that can drive translational movement of the movable element in at least one of three mutually orthogonal directions and can drive rotational movement of the movable element about at least one of three mutually orthogonal axes, and the step of moving may include controlling the actuator arrangement to achieve said rotational movement. For example, the movable element may translate in one direction/along one axis, and may rotate about an orthogonal direction/axis. The translation and rotation may occur relative to the same axis (e.g. x axis) or relative to different axes (e.g. rotation about the x axis and translation along the y axis).

In other arrangements, the actuator arrangement can drive translational movement of the movable element in a plurality of orthogonal directions and can drive rotational movement of the movable element about a plurality of mutually orthogonal axes.

In such arrangements, movement of the movable element is possible with a large number of degrees of freedom. In order to achieve the desired image stabilisation, the movement can be controlled so as to cause the desired range and type of movement.

The method of this approach may be performed using an actuation assembly according to either of the above-described first or second approaches, but need not be.

The method of this approach may include any combination of some, all or none of the above-described preferred and optional features.

The present techniques may in general be applied to any type of device that comprises a static part and a moveable part which is moveable with respect to the static part. By way of non-limitative example, the actuator assembly may be, or may be provided in, any one of the following devices: a smartphone, a camera, a foldable smartphone, a foldable smartphone camera, a foldable consumer electronics device, an image capture device, a foldable image capture device, an array camera, a 3D sensing device or system, a servomotor, a consumer electronic device (including domestic appliances), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), a security system, a gaming system, a gaming accessory (e.g. controller, headset, a wearable controller, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle. It will be understood that this is a non-exhaustive list of example devices.

Embodiments of the present techniques will now be described by way of example with reference to the accompanying drawings in which.

In the following description, the present techniques will be described with reference to a camera in which optical image stabilisation is desired. However, this is one non-limiting example use of the present techniques and it will be understood that the present techniques may be used in any optical system and for any purpose. For example, the present techniques may be used to improve the performance of a system used to perform 3D sensing (i.e. generate a 3D representation of a scene).

Figure 1:
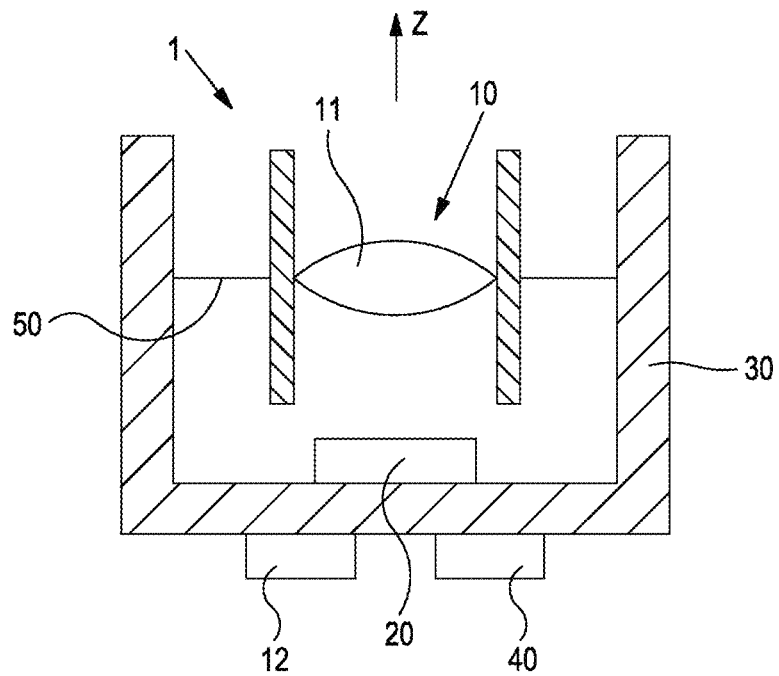
FIG. 1 is a schematic side view of an SMA actuation arrangement.

FIG. 1 illustrates an SMA actuation arrangement 1 for a camera. The SMA actuation arrangement 1 comprises a support structure 30 having an image sensor 20 mounted thereon. A camera lens element 10 is suspended on the support structure 30 and is arranged to focus an image on the image sensor 20. The camera lens element comprises one or more lenses 11, a single lens being illustrated in FIG. 1 for clarity. The camera is a miniature camera in which the or each lens 11 has a diameter of no more than 20 mm.

The SMA actuation arrangement 1 is for a miniature camera in which the camera lens element 10 is the movable element.

Plural SMA actuator wires 50 are connected in tension between the support structure 30 and the camera lens element 10. The camera lens element 10 may be suspended on the support structure 30 exclusively by the SMA actuator wires 50. Alternatively, the camera lens element 10 may be suspended on the support structure 30 by a suspension system (not shown) that may have any suitable form for allowing movement of the camera lens element 10 with respect to the support structure 30 with the desired degrees of freedom, for example formed by flexures to allow movement in three dimensions, or formed by ball bearings or sliding bearings to allow movement in two dimensions while constraining movement in a third dimension, or constraining movement within a particular range of movement.

The SMA actuator wires 50 are in an arrangement in which the SMA actuator wires 50 are capable of driving movement of the camera lens element 10 with respect to the support structure 30 with plural degrees of freedom on selective contraction of the SMA actuator wires 50. The SMA actuator wires 50 may be configured to drive such movement as shown in FIG. 2 or FIG. 3 which show first and second configurations of the SMA actuation arrangement 1, or in general may have other configurations.

The first and second configurations of the SMA actuation arrangement 1 will now be described. For ease of reference, the z axis is taken to be the optical axis of the camera lens element 10 and the x and y axes are perpendicular thereto. In the desired orientation of the camera lens element 10, the optical axis of the camera lens element 10 is perpendicular to the image sensor 20 and the x and y axes are lateral to the image sensor 20.

Figure 2:
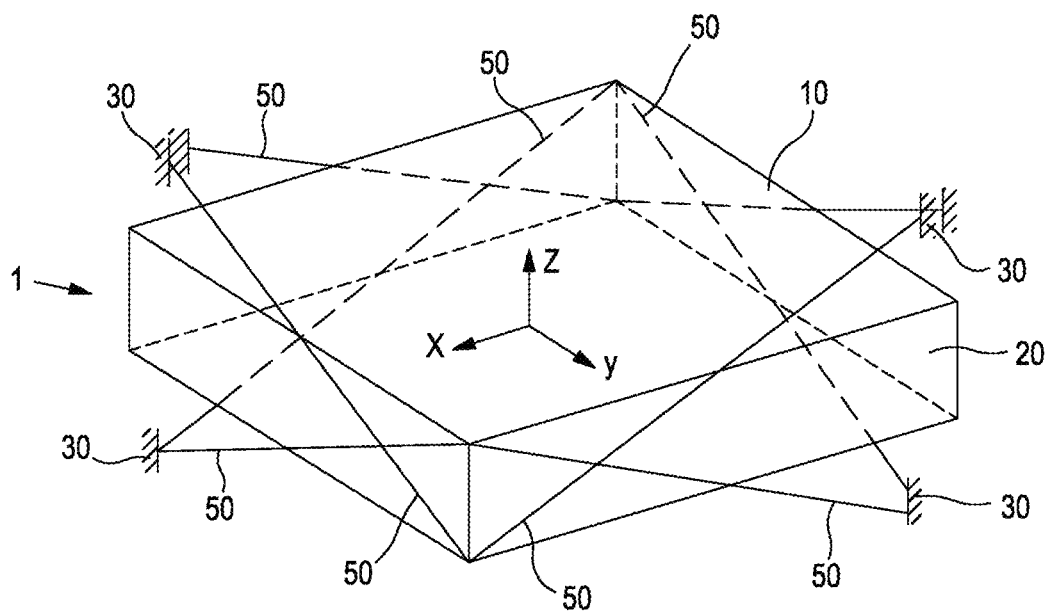
FIG. 2 is a perspective view of a first configuration of the SMA actuation arrangement.
Figure 3:
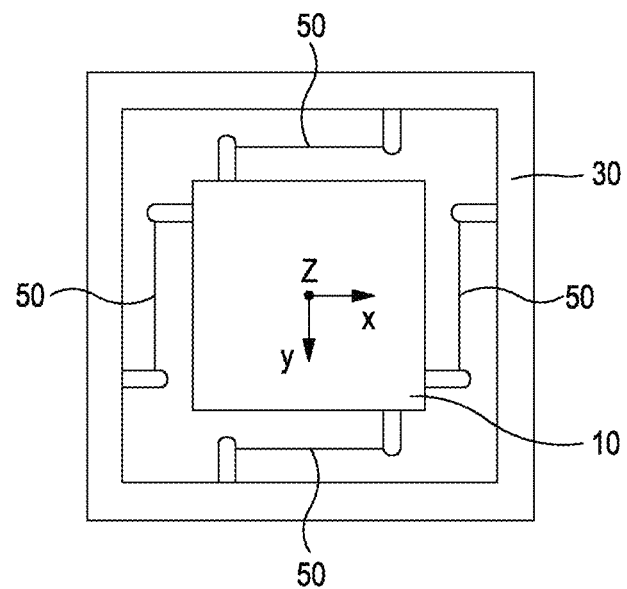
FIG. 3 is an axial view of a second configuration of the SMA actuation arrangement.
Figure 4:
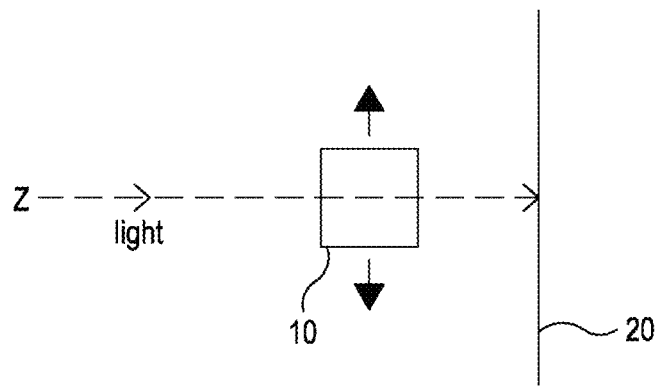
FIG. 4 shows a schematic cross sectional view of a known camera apparatus used for correcting camera shake and has already been described.

FIG. 2 illustrates a first configuration for the SMA actuator arrangement 1 in which eight SMA actuator wires 50 are provided. In the first configuration, the SMA actuation arrangement 1 may have a construction as described in further detail in any of WO-2011/104518, WO-2012/066285 or WO-2014/076463, to which reference is made. However, an overview of the arrangement of SMA actuator wires 50 is as follows.

Two SMA actuator wires 50 are provided on each of four sides of the camera lens element 10 in a 2-fold rotationally symmetric arrangement. Each SMA actuator wire 50 extends perpendicular to a line radial of the optical axis of the camera lens element 10, that is substantially perpendicular to the x axis or to the y axis. However, the SMA actuator wires 50 are inclined with respect the optical axis of the camera lens element 10, so that they each provide a component of force along the z axis and a component of force primarily along the x axis or primarily along the y axis.

Each SMA actuator wire 50 is connected at one end to the support structure 30 and at the other end to the camera lens element 10, selected so that in combination with the inclination of the SMA actuator wires 50, different SMA actuator wires 50 provide components of force in different directions along the z axis and different directions along the x axis or along the y axis. In particular, the pair of SMA actuator wires 50 on any given side of the camera lens element 10 are connected to provide components of force in opposite directions along the z axis, but in the same direction along the x axis or along the y axis. The two pairs of SMA actuator wires 50 on opposite sides of the camera lens element 10 are connected to provide components of force in opposite directions along the x axis or along the y axis.

Thus, the SMA actuator wires 50 are capable, on selective contraction, of driving movement of the camera lens element 10 with respect to the support structure 30 in translational movement with three degrees of freedom (i.e. along the x, y and z axes) and also rotational movement with three degrees of freedom (i.e. around the x, y and z axes). Due to the symmetrical arrangement, movement with each of the degrees of freedom is driven by contraction of different combinations of SMA actuator wires 50. As the movements add linearly, movement to any translational and/or rotational position within the six degrees of freedom is driven by a linear combination of contractions of the SMA actuator wires 50. Thus, the translational and rotational position of the camera lens element 50 is controlled by controlling the drive signals applied to each SMA actuator wire 50.

In use, translational movement along the optical axis of the camera lens element 10 (i.e. along the z axis) may be used to change the focus of an image formed by the camera lens element 10 and translational movement laterally of the optical axis of the camera lens element 10 (i.e. along the x and y axes) may be used to provide OIS, in conjunction with the rotary motion described in more detail below.

FIG. 3 illustrates a second configuration for the SMA actuator arrangement 1 in which only four SMA actuator wires 50 are provided. In the second configuration, the SMA actuation arrangement 1 may have a construction as described in further detail in any of WO-2013/175197 or WO-2014/083318, to which reference is made. However, an overview of the arrangement of SMA actuator wires 50 is as follows.

In the second configuration, movement of the camera lens element 10 with respect to the support structure 30 along the optical axis (i.e. along the z axis) is constrained mechanically, for example by a suspension system which supports the camera lens element 10 on the support structure 30, which may comprise beams as disclosed in WO-2013/175197, ball bearings as disclosed in WO-2014/083318, or a sliding bearing. Thus fewer SMA actuator wires 50 are provided with a simpler arrangement as it is not necessary to drive movement along the optical axis.

One SMA actuator wire 50 is provided on each of four sides of the camera lens element 10 in a 2-fold rotationally symmetric arrangement. Each SMA actuator wire 50 extends substantially perpendicular to a line radial of the optical axis of the camera lens element 10, that is substantially perpendicular to the x axis or to the y axis and thus provides a component of force primarily along the x axis or primarily along the y axis. Each SMA actuator wire 50 is connected at one end to the support structure 30 and at the other end to the camera lens element 10. The ends at which the SMA actuator wires 50 are connected to the support structure 30 alternate on successive sides around the z axis. As a result, the pairs of SMA actuator wires 50 on opposing sides provide a component of force in opposite directions along the x axis or in opposite directions along the y axis. However, the torques applied by two pairs of SMA actuator wires 50 are in opposite directions around optical axis (z axis).

Thus, the SMA actuator wires 50 are capable, on selective contraction, of driving movement of the camera lens element 10 with respect to the support structure 30 to translational movement with two degrees of freedom (i.e. along the x and y axes) and also rotational movement with one degrees of freedom (i.e. around the z axis). Due to the symmetrical arrangement, movement with each of the degrees of freedom is driven by contraction of different combinations of SMA actuator wires 50. As the movements add linearly, movement to any translational and/or rotational position within the three degrees of freedom is driven by a linear combination of contractions of the SMA actuator wires 50. Thus, the translational and rotational position of the camera lens element 10 is controlled by controlling the drive signals applied to each SMA actuator wire 50.

In use, translational movement laterally of the optical axis of the camera lens element 20 (i.e. along the x and y axes) may be used to provide OIS in conjunction with the rotary motion described in more detail below.

The SMA actuation arrangement 1 further comprises a control circuit 12 which may be implemented in an integrated circuit chip. The control circuit 12 is arranged to supply drive signals to the SMA actuator wires 50. The SMA actuation arrangement 1 further comprises a vibration sensor 40 which detects the vibrations that the SMA actuation arrangement 1 is experiencing.

Figure 5:
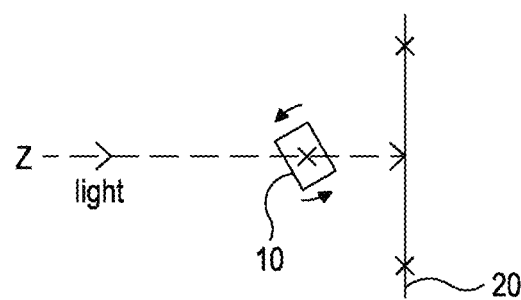
FIG. 5 shows, schematically, how rotation or "tilt" of a lens element affects the light arriving at an image sensor.

FIG. 5 shows, schematically, the effect of lens tilt on an optical system such as a miniature camera. When the lens element 10 is rotated about an axis parallel to the plane on the image sensor 20 and passing through the centre of the lens element (or the effective centre of a compound lens element comprising several lenses), light passing along the optical axis z (centre line) of the lens element will be unaffected. However, light at the edges of the image sensor 20 will move out of focus and blur. The amount of blur will depend on the size of the image sensor, the F# of the lens element (or depth of field) and the effective focal length (EFL) of the lens element.

To solve this problem of blurring, it has been realised that a combination of shifting (lateral movement of the lens element 10 in a plane parallel to the plane of the image sensor 20) and tilting is advantageous. This can also be encapsulated as rotating the lens element about an axis which is perpendicular to the optical axis, but which does not pass through the effective centre of the lens element. Such rotation will move the effective centre of the lens element laterally with respect to the image sensor, as well as rotating the lens element such that the optical axis of the lens element 10 is no longer perpendicular to the plane of the image sensor 20.

The effective centre of a lens element is the centre of the optical aperture stop (the point through which all principal rays pass). When the lens is positioned so as to focus the image of an object that is at "infinity" onto the image sensor, this centre of the lens is at a distance from the image sensor that is equal to the effective focal length of the lens element.

Figure 6:
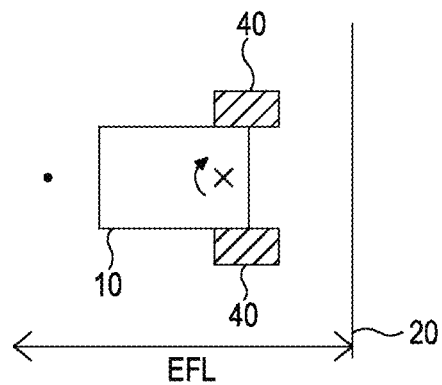
FIG. 6 shows, schematically, how an actuator may be used to achieve tilt of a lens element.

FIG. 6 shows, schematically, how a lens element 10 may be caused to tilt by the functioning of an actuator 40. In this configuration, the actuator 40 causes rotation of the lens element about the centre of the actuator. Due to the positioning of the actuator 40 relative to the lens element 10, the rotation about the centre of the actuator is not rotation about an axis passing through the effective centre of the lens.

The lens element 10 may be a compound lens element, which may comprise several (e.g. 5 or more) individual lenses that may have different shapes, different functions, different refractive indices and/or may be made of different materials. Typically compound lens elements are formed of lenses made from plastic materials, but glass may also be used for one or more of the lenses.

The amount of blur that is desirable and/or acceptable may vary depending on the type of image being captured. For example, when a camera is being used to take a "selfie" (a close-up picture of the user), then blur at the edges of the image may be acceptable. However, if the camera is being used to take a picture of a landscape, then blurring at the edges may not be acceptable. The control algorithm may therefore contain software which determines the type of image being captured and adjusts the OIS operation accordingly.

Figure 7A:
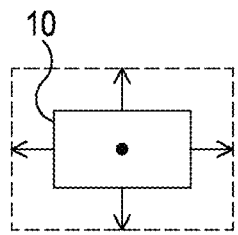
FIG. 7 shows, schematically, how the use of tilt can increase the available movement of the lens element.
Figure 7B:
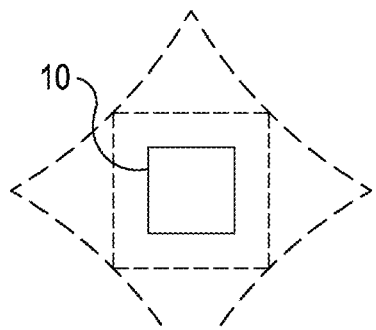
Figure 7C:
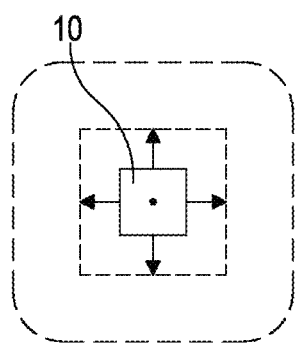

FIG. 7 shows, conceptually, the effect of providing tilt as well as translation of the lens element 10 in OIS. The dotted lines in FIG. 7a show the maximum displacement of a lens element 10 in an OIS which uses translation only. This maximum displacement is therefore the maximum available displacement for the lens element to compensate for shake. FIG. 7b shows how the use of translation and rotation can be used to increase the effective displacement available for correction using an eight wire actuator of the type shown in FIG. 2. (The diamond-shaped dotted line shows the possible maximum available displacement/stroke). FIG. 7c shows how the use of translation and rotation can be used to increase the effective displacement available for correction using the actuators of the types shown in FIGS. 3 and 10-18. (The outermost dashed line shows the possible maximum available displacement/stroke). The exact amount of additional compensation that is possible depends on the properties of the compound lens and the EFL. Generally speaking, the larger the EFL, the greater the additional compensation that is possible. It has been found to be possible to obtain up to a $\sqrt{2}$ times improvement in available compensation for OIS systems using translational and rotational movement relative to OIS systems which use only translational movement to compensate for shake.

The actuators and control approaches used may be any known alternatives which permit the appropriate movement of the lens element, and in particular may be the arrangements shown in FIG. 2 or 3. In other arrangements, the actuators may include voice coil motors (VCMs), such as VCM actuators for OIS.

The actuators and control circuit may be arranged to apply the rotation of the lens element in any number of ways in order to compensate for shake of the camera. The exact approach chosen may depend on one or more properties of the lens element (e.g. the EFL), the overall specification of the camera assembly (e.g. the amount of translation and tilt motion possible in the particular camera assembly), predetermined specifications by the manufacturer/customer of the device in which the camera assembly is incorporated.

In some arrangements, particularly where the motion of the lens element is controlled by a control circuit, rather than constrained by the physical mounting or connection of the lens element and/or the actuators, the control circuit may be able to cause a number of different approaches to be used (the motion requirements for the different approaches may be stored in a memory device connected to the control circuit), for example depending on inputs to the control circuit such as the type of picture being taken or the amount or severity of the shake.

The type of picture being taken can be determined from pre-capture analysis of the image being recorded by the image sensor, using algorithms that are known in the art.

The amount or severity of the shake experienced by the camera assembly can be detected by vibration sensors, which may be gyroscopes, accelerometers or others, this being understood as a non-exhaustive list.

For example, the motion of the lens element when applying OIS may be controlled to apply translational shift only until the limit of available shift motion is reached and then to apply tilt motion. In such an arrangement the limit of available shift may be determined by the limits of the actuator. Purely by way of example of such an arrangement, 0 to 1.1 degrees of shake/movement could be compensated for by using shift only, whilst for 1.1 to 1.5 degrees could be compensated for by using 0.6 degrees of shift compensation and the remaining compensation provided using tilt.

In another example, the motion of the lens element may again be controlled to apply shift only until the limit of available shift motion is reached, and then apply tilt motion. However, once the limit of tilt motion is reached at the extreme shift, the shift may be decreased in order to allow further tilt to be applied. In the example described at the end of the previous paragraph, if more than 1.6 degrees of compensation was required, then the amount of shift compensation may be reduced and the amount of tilt compensation then increased further.

In another example, for every amount of shake, the motion of the lens element may be controlled so that the compensation is partly provided by using shift and partly by using tilt. The ratio between the amount compensated for by shift and the amount compensated for by tilt may be fixed, or may vary according to a predetermined pattern, depending on the total compensation required.

In certain arrangements, the rotational motion of the lens element in the OIS may result from the physical mounting of the lens element. A number of potential arrangements which could result in such motion exist and fall within the scope of the present techniques; the following are accordingly merely examples of possible arrangements. Each arrangement will be illustrated by schematic cross sectional figures showing the lens element in a "rest" position and in one or more translated positions during OIS.

Except where the context requires otherwise, the term "bearing" is used herein as follows. The term "bearing" is used herein to encompass the terms "sliding bearing", "plain bearing", "rolling bearing", "ball bearing", "roller bearing" and "flexure". The term "bearing" is used herein to generally mean any element or combination of elements that functions to constrain motion to only the desired motion. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. In embodiments, the bearing may be provided on, or may comprise, non-linear bearing surfaces.

In some embodiments of the present techniques, more than one type of bearing element may be used in combination to provide the bearing functionality. Accordingly, the term "bearing" used herein includes any combination of, for example, plain bearings, ball bearings, roller bearings and flexures.

In some embodiments, a suspension system may be used to suspend the intermediate moveable element and to constrain motion to only the desired motion. For example, a suspension system of the type described in WO2011/104518 may be used. Thus, it will be understood that the term "bearing" used herein also means "suspension system".

Figure 8:
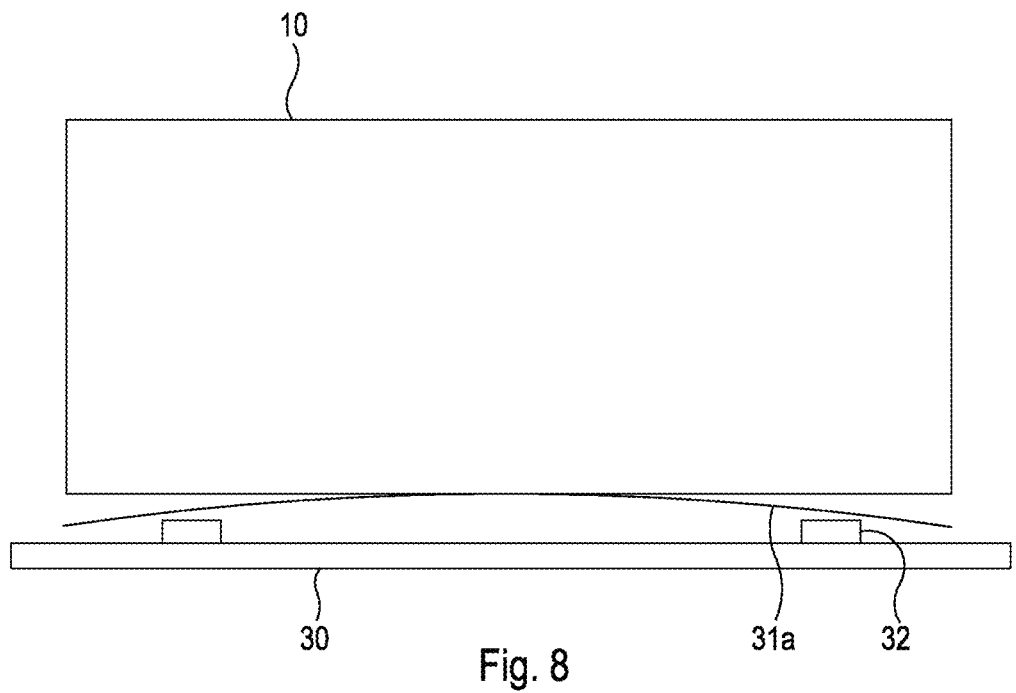
FIGS. 8 and 9 shows schematic cross sectional views of a mounting arrangement for a lens element in one configuration.
Figure 9:
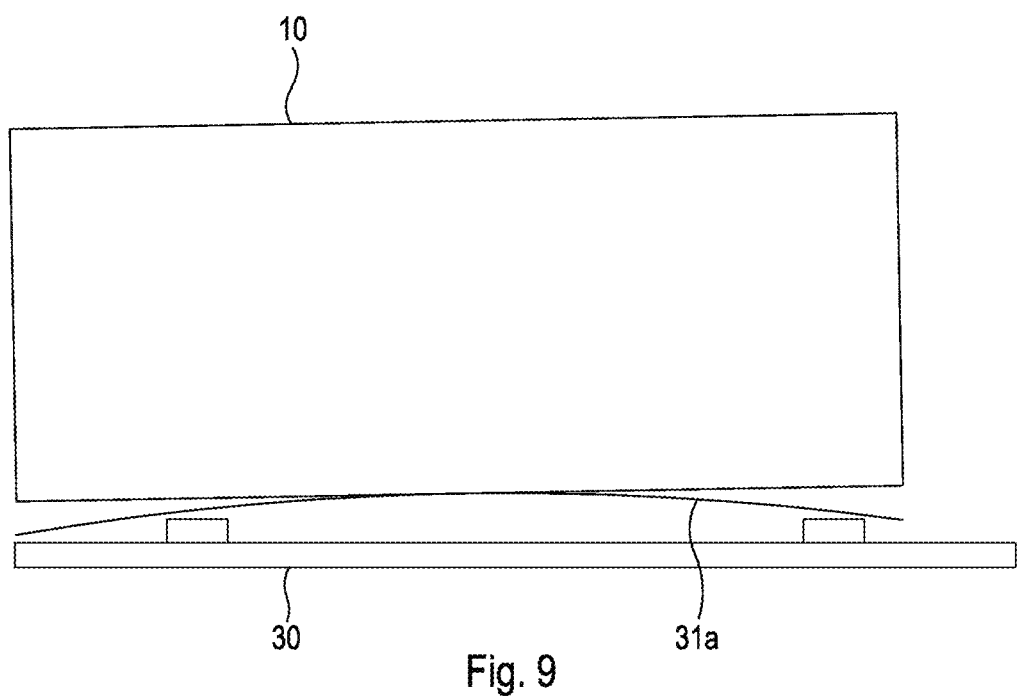

FIGS. 8 and 9 show a first potential configuration in which the lens element 10 is mounted to the support structure 30 by a spring plate 31a which is mounted on a plurality of bearings 32. This is an adaptation of the arrangement in existing configurations in which a flat spring plate is used which rests on 4 flat bearings. The auto focus element is glued to this spring plate and moves normal to the effective bearing surface to achieve image stabilisation to reduce or remove the effects of shake. Small changes in the mean auto focus position may be made to adjust for the focus change caused by the rotation.

In the configuration shown in FIGS. 8 and 9, the spring plate 31a is in the shape of a part-sphere, with its centre located at a point on the optical axis of the lens element (so that the spring plate is rotationally symmetrical around the optical axis), and the bearings 32 have rounded edges (or are "coined") to accommodate the non-flat shape of the spring plate.

The spherical shape of the spring plate 31a creates a linear relationship between translational movement and rotation of the lens element 10 (for example, such that every 30 µm of translational movement ("stroke") causes rotation movement ("tilt") of 0.1 degrees). FIG. 9 shows how the lens element 10 tilts as the stroke increases.

Figure 10:
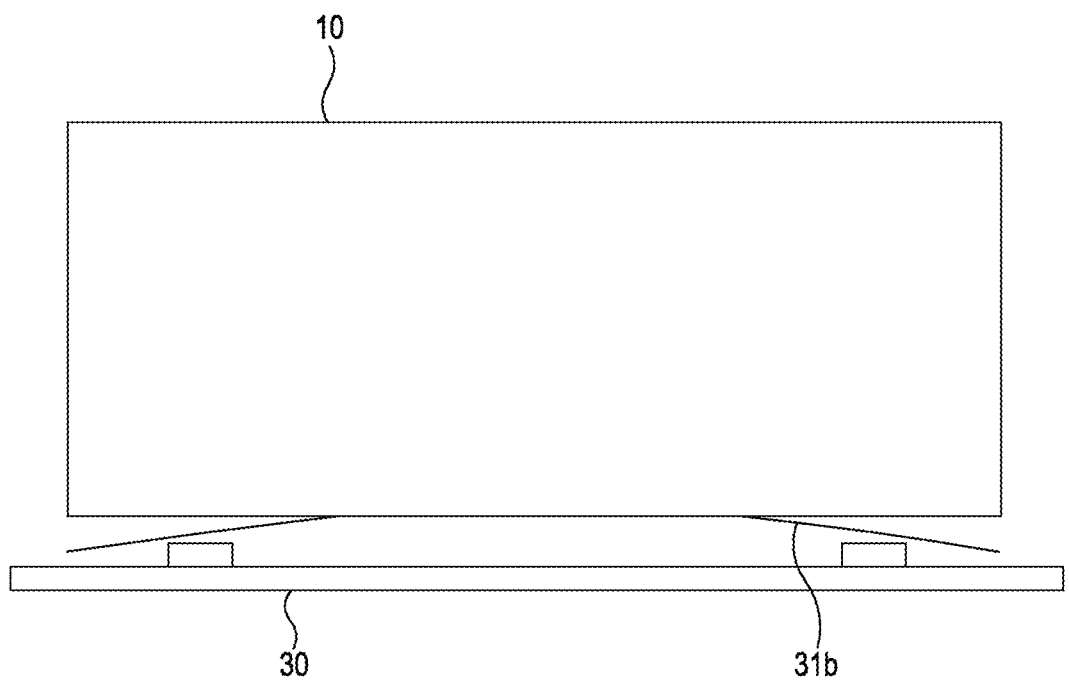
FIGS. 10 and 11 show schematic cross section views of a mounting arrangement for a lens element in one configuration.
Figure 11:
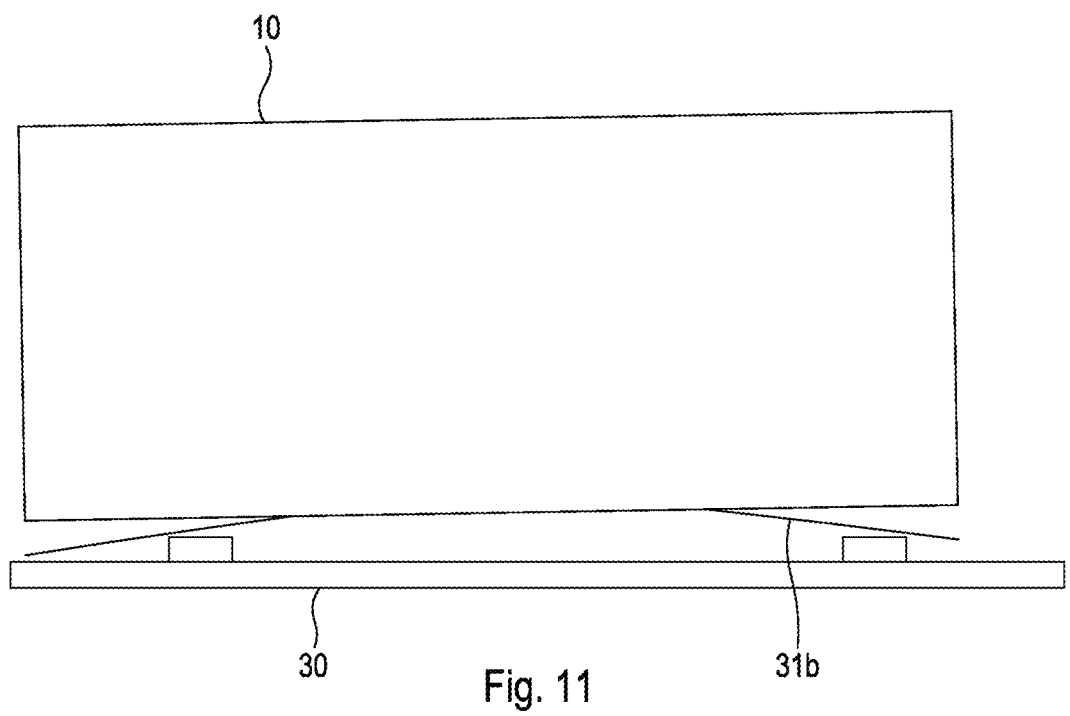

FIGS. 10 and 11 show a second potential configuration. As with FIGS. 8 and 9, a spring plate 31b is used to mount the lens element 10. However, in the configuration in FIGS. 10 and 11, the spring plate 31b has a different profile, taking the form of a cone (which may be a standard cone as depicted in FIGS. 10 and 11, or a round-nosed cone). The spring plate 31b shown in FIGS. 10 and 11 causes a non-linear relationship between stroke and tilt. FIG. 11 shows how the lens element 10 tilts as the stroke increases.

Figure 12:
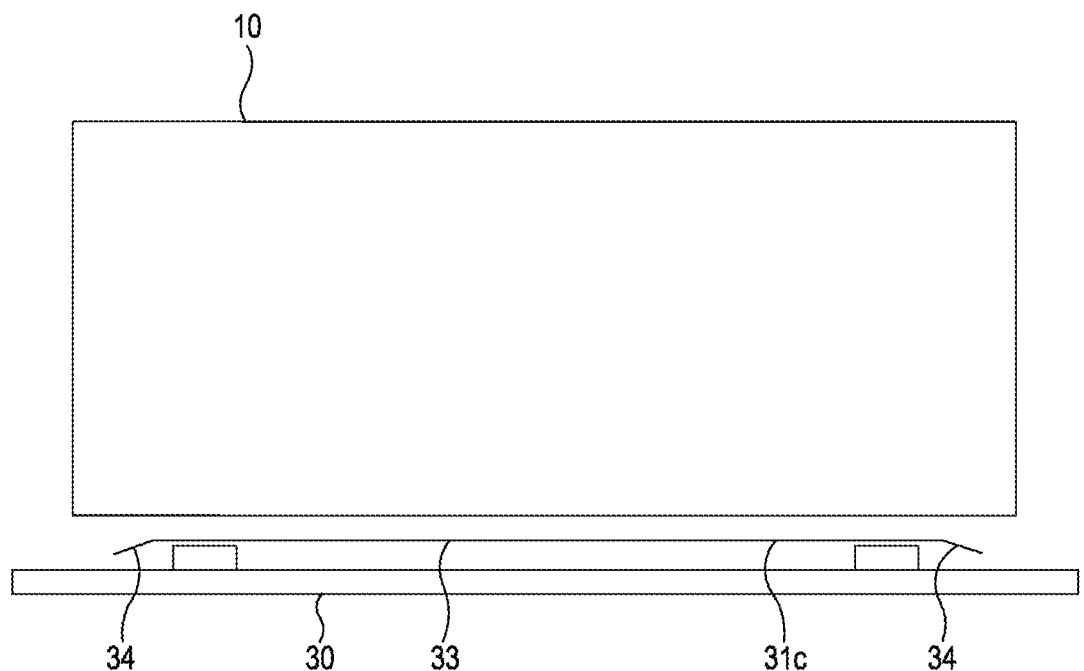
FIGS. 12-14 show schematic cross section views of a mounting arrangement for a lens element in one configuration.
Figure 13:
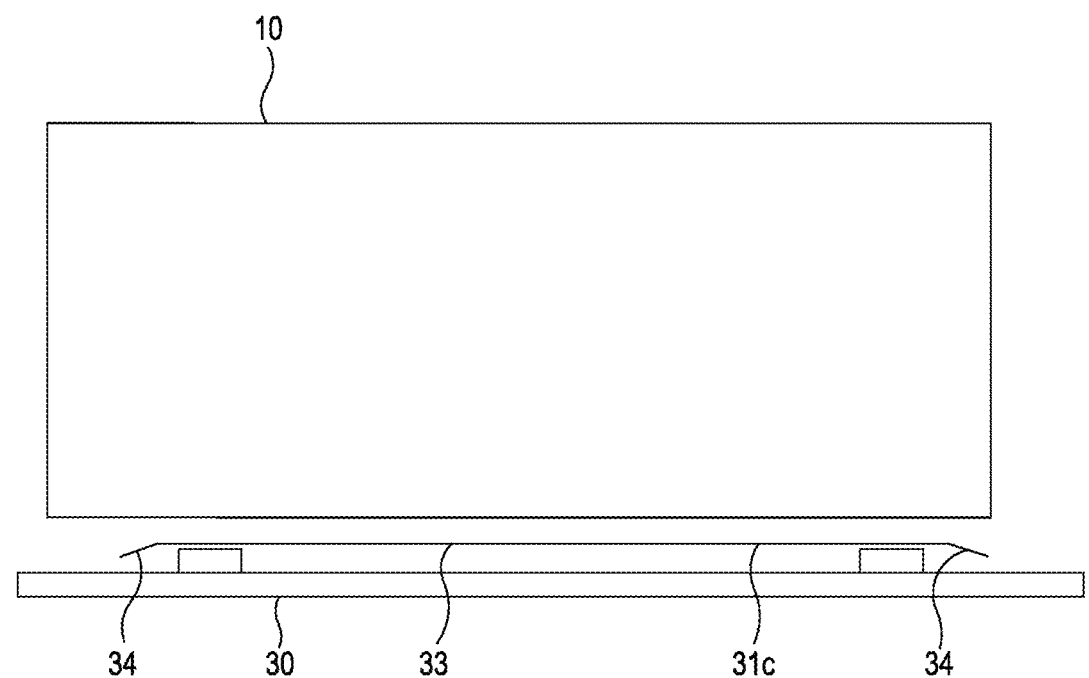
Figure 14:
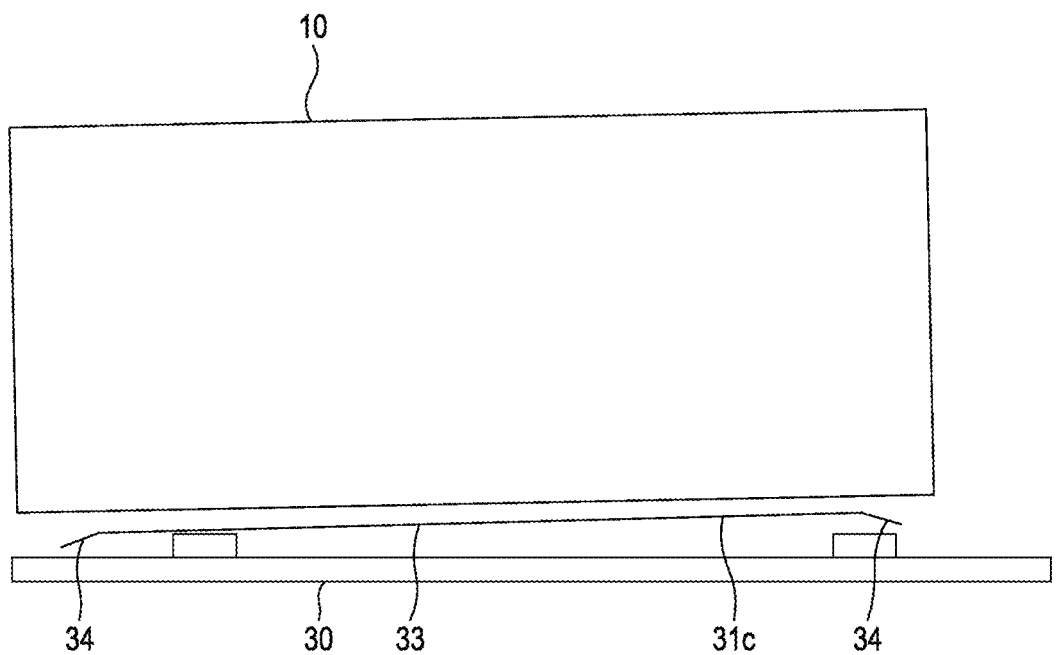

FIGS. 12-14 show a third potential configuration. As with FIGS. 8-11, a spring plate 31c is used to mount the lens element 10. In the configuration of FIGS. 12-14, the spring plate 31c has a central region 33 which is flat and parallel to the plane of the image sensor and an outer region 34 which is angled (or "stepped"). As a result, lower amplitudes of stroke up to the edge of the central region 33 (for example up to 50 µm) do not cause any tilt, as shown in FIG. 13, whilst further stroke beyond that point cause tilt due to the stepped outer region 34, as shown in FIG. 14. The outer region 34 may be angled as shown in FIGS. 12-14, or may have a curved profile.

Figure 15:
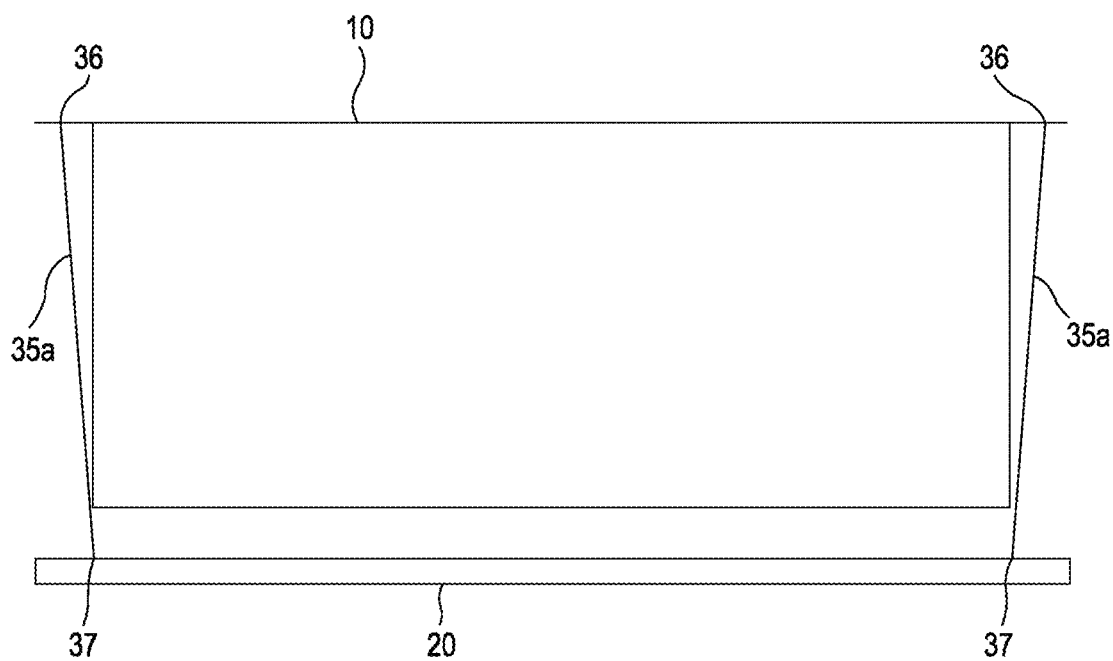
FIGS. 15 and 16 show schematic cross section views of a mounting arrangement for a lens element in one configuration.
Figure 16:
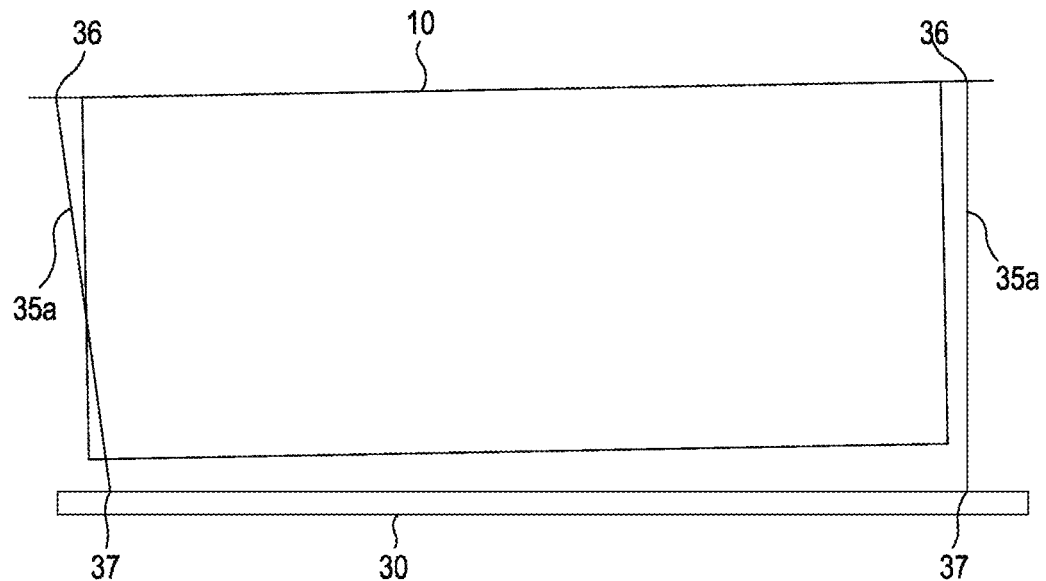

FIGS. 15 and 16 show a fourth potential configuration in which the lens element 10 is mounted to the support structure 30 by a plurality of pillars 35a. This is an adaptation of the arrangement in existing configurations such as a voice-coil motor ("VCM") OIS and/or an SMA OIS.

In existing configurations, the pillars mounting a lens element 10 to the support structure 30 are parallel to each other (and perpendicular to the image sensor) to maintain minimal tilt in the rest state. However, in the configuration in FIGS. 15 and 16, the pillars 35a are arranged such that they are in a trapezium arrangement, such that the points of attachment 36 at the image sensor end of the pillars are closer together than the points of attachment 37 at the moving end. As can be seen in FIG. 16, this causes the lens element 10 to tilt as the stroke is increased.

Figure 17:
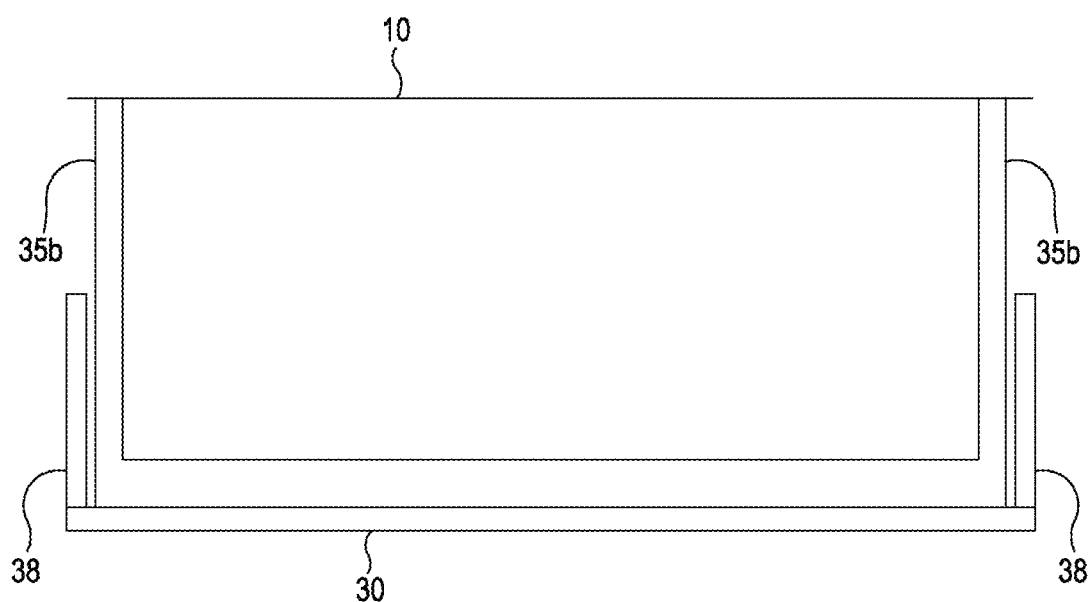
FIGS. 17 and 18 show schematic cross section views of a mounting arrangement for a lens element in one configuration.
Figure 18:
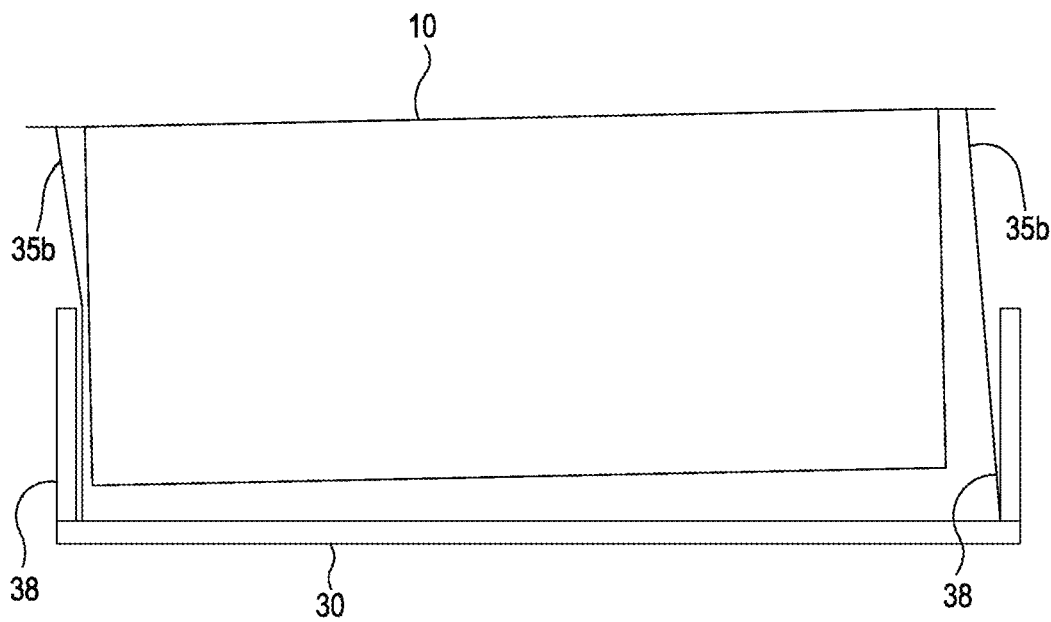

FIGS. 17 and 18 show a fifth potential configuration. In this configuration the lens element is mounted to the support structure 30 by a plurality of pillars 35b. However, the pillars 35b in this configuration are arranged parallel to each other and are flexible. The support structure 30 has additional solid pillars (or walls) 38 which are arranged close to the pillars 35b in the rest position (FIG. 17) and extend up part of the length of the pillars. As shown in FIG. 18, when the lens element 10 is translated laterally, one or more of the flexible pillars 35b comes into contact with a solid pillar 38, causing it to bend about the uppermost point of contact with the solid pillar. This bending causes the lens element 10 to tilt.

Appropriate selection of the separation between the flexible and solid pillars can result in configurations in which a certain amount of stroke is possible before tilt starts to occur. Similarly, the amount of tilt for a given increase in stroke can be selected by the relative height of the solid pillars 38 compared to the length of the flexible pillars 35b.

Figure 19:
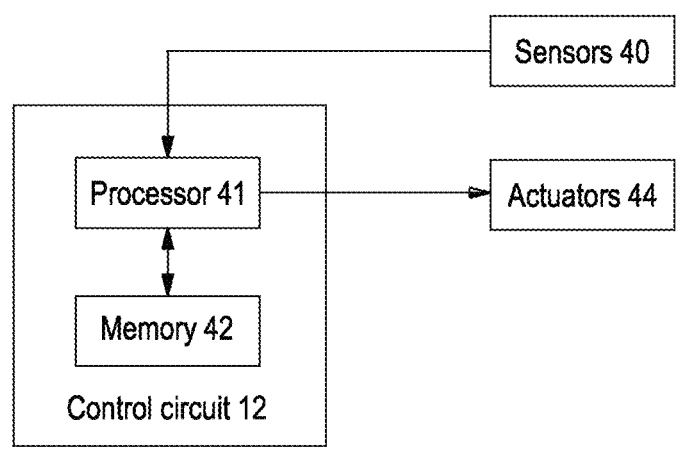
FIG. 19 shows a control circuit for controlling a camera assembly.

FIG. 19 shows a schematic arrangement of a control circuit 12 for controlling a camera assembly. The control circuit 12 includes a processor 41 and a memory device 42.

The processor receives inputs from sensors 40 which are physically coupled to the camera assembly and detects the vibrations experienced by the camera assembly. The sensor 40 may be a vibration sensor such as a gyroscope sensor which detects the angular velocity of the camera assembly in three dimensions or an accelerometer which detects motion allowing the orientation and/or position to be inferred. The control circuit monitors these inputs and determines any shake of the camera assembly when capturing an image.

The control circuit sends actuation signals to actuators 44 (such as SMA actuator wires) to cause the lens element of the camera assembly to move relative to the image sensor according to the techniques described above and thereby correct or compensate for the detected shake. The memory device 42 may store predetermined algorithms for correcting for shake which the processor 41 uses to drive the actuators 44.

Figure 20:
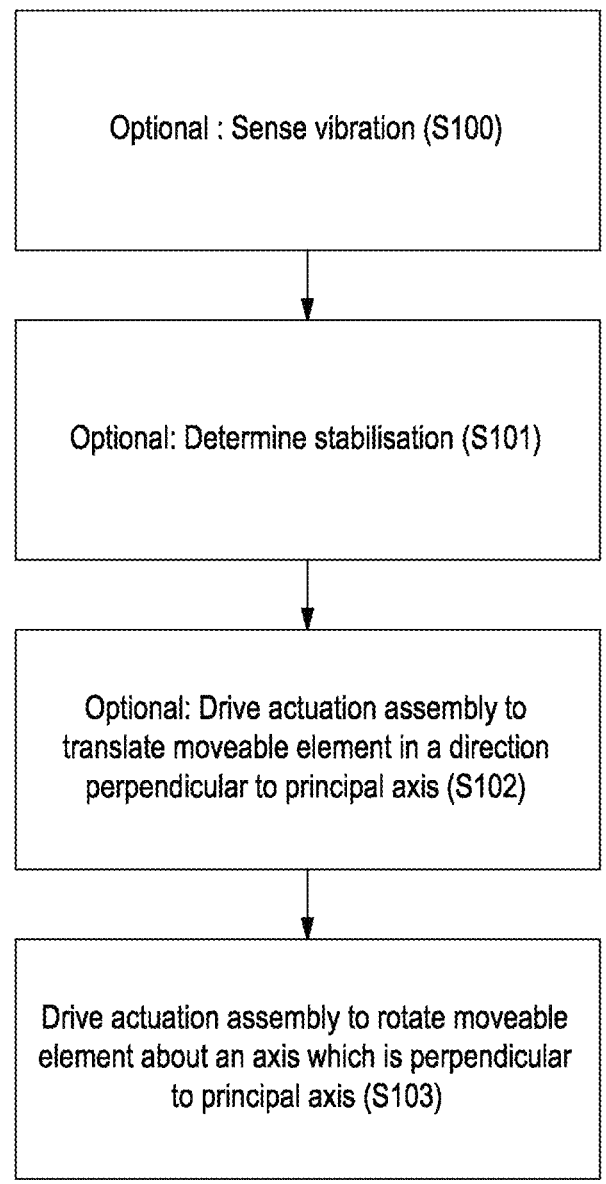
FIG. 20 is a flowchart showing the steps in a method according to the present techniques.

FIG. 20 is a flow chart showing the steps in an exemplary method according to the present techniques. The method comprises moving the movable element relative to the support structure by rotating the movable element about an axis which is perpendicular to the principal axis and which does not pass through the centre of the movable element (step S103). The method may comprise sending instructions or drive signals to a control circuit that drives the actuation assembly.

In embodiments, where the method is being used to perform optical image stabilisation, the method may comprise sensing vibration of the camera assembly (step S100), in particular at a time when an image is being captured, or about to be captured. The control circuit may determine an appropriate stabilisation response (step S101) and drives the actuators (S103) to perform the desired stabilisation response. The steps of the method may be performed repeatedly, for example during the process of the image capture, in order to ensure that a stabilised image is captured on the image sensor at the moment when a user causes said capture.

As mentioned above, the present techniques may be used to perform optical image stabilisation or may be used to perform 3D sensing/depth mapping. In either case, the method may further comprise translating the movable element in a direction perpendicular to the principal axis (step S102). In embodiments, the method may comprise first translating the movable element in a direction perpendicular to the principal axis (step S102), and then rotating, following the translating, the movable element about the axis perpendicular to the principal axis that does not pass through the centre of the movable element (step S103).

In a related approach of the present techniques, there is provided a non-transitory data carrier carrying processor control code to implement any of the methods described herein.

Although the above approaches have been described with specific reference to cameras and camera assemblies, it will be appreciated that the configuration and/or control of the actuator assemblies involved can be applied in other fields where controlled movement of a movable element relative to a support structure is desirable.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An actuation assembly comprising:
a support structure;
a movable element movable relative to the support structure, the movable element having a principal axis;
an actuator arrangement for driving movement of the movable element with respect to the support structure, wherein said movement includes:
rotational movement of the movable element about an axis which is perpendicular to said principal axis and does not pass through a centre of the movable element; and
translational movement of the movable element in a direction perpendicular to the principal axis, the translational movement occurring separately from the rotational movement; and
a control circuit configured to:
control the actuator arrangement to drive movement of the movable element relative to the support structure;
translate the movable element in a direction perpendicular to the principal axis until a limit of available translational motion in the direction is reached; and
rotate the movable element about the axis perpendicular to the principal axis that does not pass through the centre of the movable element, wherein the control circuit is arranged to rotate the movable element after the translation.

2. The actuation assembly according to claim 1, further comprising a suspension system supporting the movable element on the support structure, wherein the suspension system is arranged to guide rotational movement of the movable element about an axis which is perpendicular to said principal axis and does not pass through the centre of the movable element.

3. The actuation assembly according to claim 2, wherein the suspension system includes a spring plate positioned between the support structure and the movable element, wherein the shape of the spring plate guides said rotational movement when the movable element is translated in a direction perpendicular to said principal axis.

4. The actuation assembly according to claim 3, wherein the spring plate is in the form of a partial sphere whose axis of rotational symmetry is the principal axis, or in the form of a cone whose axis of rotational symmetry is the principal axis, or wherein the spring plate has a planar central region arranged perpendicular to the principal axis and an outer region which is angled relative to the central region, such that translational movement of the movable element across the central region does not cause the movable element to rotate and translational movement of the movable element across the outer region causes a lens element to rotate.

5. The actuation assembly according to claim 2, wherein the suspension system includes a plurality of beams each having an extent along the principal axis and from which the movable element is suspended, the beams each having a first end which is connected to the movable element and a second end which is connected to the support structure, wherein the distance between the first ends of any pair of said beams is different from the distance between the second ends of said pair of beams.

6. The actuation assembly according to claim 2, wherein the suspension system includes a plurality of flexures each having an extent along the principal axis, and further comprising at least one fixed obstruction element, the obstruction element or elements being arranged to engage with said flexures so as to cause bending of at least one of said flexures when the movable element is moved more than a predetermined distance in a direction perpendicular to the principal axis, and thus guide rotation of the movable element about an axis perpendicular to the principal axis.

7. The actuation assembly according to claim 3, wherein the actuator arrangement is arranged to drive translational movement of the movable element in at least one direction perpendicular to the principal axis, the suspension system at least partially converting said translational movement into said rotational movement.

8. The actuation assembly according to claim 1, wherein the actuator arrangement is arranged to drive movement of the movable element with respect to the support structure that includes translational movement of the movable element in at least one of three mutually orthogonal directions and rotational movement of a lens element about at least one of three mutually orthogonal axes.

9. The actuation assembly according to claim 1, wherein the actuator arrangement includes a plurality of SMA actuator wires.

10. The actuation assembly according to claim 1, further comprising a sensor attached to the support structure, and wherein:
the movable element is arranged to focus electromagnetic radiation on the sensor; and
the actuator arrangement drives movement of the movable element in order to focus the electromagnetic radiation on the sensor.

11. The actuation assembly according to claim 1, further comprising a light source arranged to emit illumination on to a scene, wherein the actuator arrangement drives movement of the illumination across at least part of the scene.

12. The actuation assembly according to claim 1, wherein the movable element is a light source arranged to emit illumination on to a scene, wherein the actuator arrangement drives movement of the movable element to move the illumination across at least part of the scene.

13. The actuation assembly as claimed in claim 11, wherein the illumination is non-uniform.

14. A method of controlling an actuation assembly, the actuation assembly comprising a support structure, and a movable element, the movable element being supported on the support structure so as to be movable relative to the support structure and having a principal axis, wherein the method comprises:
moving the movable element relative to the support structure by:
rotating the movable element about an axis which is perpendicular to the principal axis and does not pass through a centre of the movable element; and
translating the movable element in a direction perpendicular to the principal axis until a limit of available translational motion in the direction is reached, the translating occurring separately from the rotating, wherein the rotating comprises rotating the movable element following the translating.

15. The method according to claim 14, wherein the actuation assembly further comprises a suspension system supporting the movable element on the support structure and arranged to guide said rotational movement, and wherein the moving the movable element further comprises driving the movable element in a first direction perpendicular to said principal axis, the suspension system at least partially converting movement in said first direction into said rotational movement.

16. The method according to claim 14, wherein the actuation assembly further comprises an actuator arrangement that can drive translational movement of the movable element in at least one of three mutually orthogonal directions and can drive rotational movement of the movable element about at least one of three mutually orthogonal axes, wherein the moving the movable element further comprises controlling the actuator arrangement to achieve said rotational movement.

17. The method according to claim 14, wherein:
the translating comprises translating the movable element in at least one of three mutually orthogonal directions; and
the rotating comprises rotating a lens element about at least one of three mutually orthogonal axes.

* * * * *